United States Patent
Carlbom et al.

(10) Patent No.: US 7,143,083 B2
(45) Date of Patent: Nov. 28, 2006

(54) METHOD AND APPARATUS FOR RETRIEVING MULTIMEDIA DATA THROUGH SPATIO-TEMPORAL ACTIVITY MAPS

(75) Inventors: Ingrid Birgitta Carlbom, Summit, NJ (US); Agata Opalach, Antibes (FR); Gopal S. Pingali, Mohegan Lake, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 409 days.

(21) Appl. No.: 10/167,539

(22) Filed: Jun. 12, 2002

(65) Prior Publication Data

US 2003/0023595 A1 Jan. 30, 2003

Related U.S. Application Data

(60) Provisional application No. 60/299,355, filed on Jun. 19, 2001, provisional application No. 60/299,335, filed on Jun. 19, 2001, provisional application No. 60/297,539, filed on Jun. 12, 2001.

(51) Int. Cl.
G06F 17/30 (2006.01)

(52) U.S. Cl. .................. 707/3; 707/2; 707/4; 707/5

(58) Field of Classification Search .............. 707/2, 707/6, 102, 3, 4, 5; 345/530
See application file for complete search history.

(56) References Cited

U.S. PATENT DOCUMENTS

| | | | | |
|---|---|---|---|---|
| 5,487,172 A | * | 1/1996 | Hyatt | 712/32 |
| 5,550,021 A | * | 8/1996 | Blum et al. | 435/6 |
| 5,682,882 A | * | 11/1997 | Lieberman | 600/301 |
| 5,764,283 A | | 6/1998 | Pingali et al. | |
| 6,141,041 A | | 10/2000 | Carlbom et al. | |
| 6,233,007 B1 | | 5/2001 | Carlbom et al. | |
| 6,292,830 B1 | * | 9/2001 | Taylor et al. | 709/224 |
| 6,314,363 B1 | * | 11/2001 | Pilley et al. | 701/120 |
| 6,441,846 B1 | | 8/2002 | Carlbom et al. | |
| 6,868,525 B1 | * | 3/2005 | Szabo | 715/738 |
| 6,961,664 B1 | * | 11/2005 | Selifonov et al. | 702/19 |
| 7,020,697 B1 | * | 3/2006 | Goodman et al. | 709/223 |
| 2003/0023595 A1 | * | 1/2003 | Carlbom et al. | 707/7 |
| 2003/0083804 A1 | * | 5/2003 | Pilley et al. | 701/120 |
| 2004/0006566 A1 | * | 1/2004 | Taylor et al. | 707/100 |
| 2004/0225432 A1 | * | 11/2004 | Pilley et al. | 701/117 |
| 2005/0165766 A1 | * | 7/2005 | Szabo | 707/3 |
| 2005/0182773 A1 | * | 8/2005 | Feinsmith | 707/100 |
| 2006/0059253 A1 | * | 3/2006 | Goodman et al. | 709/223 |

OTHER PUBLICATIONS

U.S. Appl. No. 10/167,534, filed Jun. 12, 2002, I.B. Carlbom et al. "Instantly Indexed Databases for Multimedia Content Analysis and Retrieval."

(Continued)

Primary Examiner—Frantz Coby

(57) ABSTRACT

Techniques for retrieval of multimedia data through visual representations are provided. Such visual representations, preferably in the form of visual activity maps or spatio-temporal activity maps, serve as an efficient and intuitive graphical user interface for multimedia retrieval, particularly when the media streams are derived from multiple sensors observing a physical environment. An architecture for interactive media retrieval is also provided by combining such visual activity maps with domain specific event information. Visual activity maps are derived from the trajectories of motion of objects in the environment. The visual activity map based techniques significantly help users in quickly and effectively discovering interesting portions of the data, and randomly accessing and retrieving the corresponding portions of the media streams.

28 Claims, 8 Drawing Sheets

OTHER PUBLICATIONS

U.S. Appl. No. 10/167,533, filed Jun. 12, 2002, I.B. Carlbom et al. "Performance Data Mining Based on Real Time Analysis of Sensor Data."

U.S. Appl. No. 10/062,800, Jan. 31, 2002, I.B. Carlbom et al. "Real-Time Method and Apparatus for Tracking a Moving Object Experiencing a Change in Direction."

P.H. Kelly et al., "An Architecture for Multiple Perspective Interactive Video," Proceedings of ACM Multimedia, pp. 201-212, 1995.

R. Y. Tsai, "An Efficient and Accurate Camera Calibration Technique for 3D Machine Vision," Proceedings of the IEEE Conference on Computer Vision and Pattern Recognition, pp. 364-374, 1986.

* cited by examiner

METHOD AND APPARATUS FOR RETRIEVING MULTIMEDIA DATA THROUGH SPATIO-TEMPORAL ACTIVITY MAPS

CROSS REFERENCE TO RELATED APPLICATIONS

This application claims priority to U.S. provisional patent applications identified as Ser. No. 60/297,539 filed on Jun. 12, 2001 and entitled "Method and Apparatus for Retrieving Multimedia Data Through Spatio-Temporal Activity Maps;" Ser. No. 60/299,335 filed on Jun. 19, 2001 and entitled "Instantly Indexed Databases for Multimedia Content Analysis and Retrieval;" and Ser. No. 60/299,355 filed on Jun. 19, 2001 and entitled "Performance Data Mining Based on Real Time Analysis of Sensor Data," the disclosures of which are incorporated by reference herein.

This application relates to U.S. patent applications identified as Ser. No. 10/167,534 entitled "Instantly Indexed Databases for Multimedia Content Analysis and Retrieval;" and Ser. No. 10/167,533 entitled "Performance Data Mining Based on Real Time Analysis of Sensor Data," filed concurrently herewith and the disclosures of which are incorporated by reference herein.

FIELD OF THE INVENTION

The present invention relates to indexing and retrieval of multimedia data and, more particularly, to methods and apparatus for indexing and retrieval of multimedia data through activity maps.

BACKGROUND OF THE INVENTION

It is important in many security, surveillance, sports and other applications to be able to retrieve multimedia data that is of interest in the application. For instance, in a security application where there are numerous video cameras/recorders monitoring a building or other area, it may be necessary to retrieve the video clips corresponding to those times when people moved about in a certain area.

As another example, in a sports broadcasting application, a television producer or a user over the Internet may be interested in getting clips of video corresponding to the times a player was in a certain portion of the playing field. A player or a coach may be interested in looking more closely at those video clips where the player moved in a certain direction in a certain portion of the field.

In such applications, it would be useful to quickly determine where and at which times activities of interest occurred and retrieve a portion (e.g., a few seconds) of video for these corresponding times rather than manually watch several hours of video.

While there has been a large amount of work done in video indexing and retrieval, including work on video retrieval in the context of sports and video surveillance and monitoring, particularly tracking the activity of people in an environment, none of this existing work discloses real time techniques for satisfactorily determining where and at which times activities of interest occurred and retrieving the portions of video for these corresponding times.

For example, in P. Kelly et al., "An Architecture for Multiple Perspective Interactive Video," Proceedings of ACM Multimedia, pp. 201–212, 1995, techniques are disclosed for determining the best view of an object among views from multiple sensors watching an environment. However, the approach suffers the same drawbacks as mentioned above.

Thus, there exists a need for techniques which overcome the above-mentioned drawbacks by enabling fast and effective retrieval of multimedia data that is of interest in the particular application.

SUMMARY OF THE INVENTION

The present invention provides techniques for retrieval of multimedia data through visual representations. Such visual representations, preferably in the form of visual activity maps or spatio-temporal activity maps, serve as an efficient and intuitive graphical user interface for multimedia retrieval, particularly when the media streams are derived from multiple sensors observing a physical environment. This type of retrieval is important in many applications.

Further, the present invention provides an architecture for interactive media retrieval by combining such visual activity maps with domain specific event information. Visual activity maps are preferably derived from the trajectories of motion of objects in the environment. Advantageously, the visual activity map based techniques significantly help users in quickly and effectively discovering interesting portions of the data, and randomly accessing and retrieving (i.e., non-linearly retrieving) the corresponding portions of the media streams.

Advantageously, in various applications, a retrieval system based on the visual activity map approach of the invention includes, but is not limited to, the following useful features: (a) summarization of voluminous media data (e.g., which can run into hours of playing time and terabytes of storage space) in the form of a visual representation that helps users quickly determine what is of interest; and (b) provision of interactive and random (i.e., nonlinear) access to the actual multimedia data, enabling the users to quickly retrieve the portions of data that they find interesting.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENT

Figure 1:
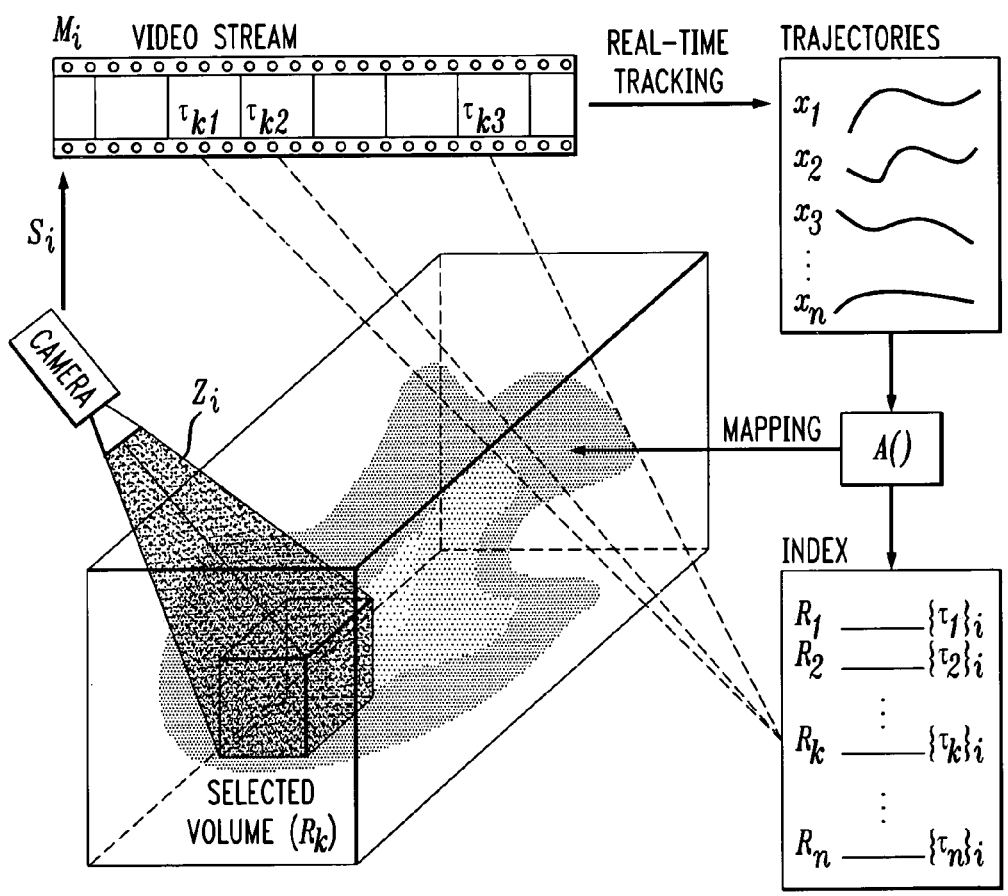
FIG. 1 is a diagram illustrating the activity map based indexing concept according to the present invention.

The following description will illustrate the invention while making reference to exemplary real world domains such as security, surveillance and sporting events. However, it is to be understood that the invention is not limited to use with any particular domain or application. The invention is instead more generally applicable to any data retrieval task in which it is desirable to assist users in discovering which portion of the data is of interest and then to retrieve the corresponding media streams.

Also, while the term "media" (particularly in the form of video) is used in the illustrative descriptions to follow, it is to be understood that the teachings provided herein equally apply to "multimedia" data, that is, multiple forms of data that may be captured from multiple sensor types. For example, multimedia data may include, but is not limited to, video data, audio data, infrared data, geophone-based data, temperature data, and/or combinations thereof, collected from multiple sensors.

For ease of reference, the remainder of the detailed description is organized as follows. Section I presents, in the context of activity map based indexing according to the invention, a description of a formulation of problems associated with media indexing and retrieval. Section II presents a description of activity map based indexing architectures according to the invention. Section III presents a description of an example application of activity map based indexing according to the invention. Section IV presents a description of a generalized hardware architecture of a computer system suitable for implementing one or more functional components of an activity map based indexing system according to the present invention.

I. Problem Formulation

Before describing illustrative embodiments of an activity map based indexing architecture, the inventive concept of activity maps will be generally explained with reference to FIG. 1 in the context of media indexing and retrieval problems.

Consider a set of sensors $S_1, S_2, \ldots, S_k$ sensing a three dimensional environment W. Each sensor $S_i$ produces a media stream $M_i(t)$ which is a function of time. As each sensor $S_i$ observes a portion of the three dimensional environment W, it has an associated zone of perception $Z_i$ (view volume for camera or sensitivity pattern for microphones) as illustrated in FIG. 1, which defines the volume of space observed by $S_i$. If $S_i$ is a moving sensor, the corresponding zone is a function of time $Z_i(t)$.

In this context, the media retrieval problem is to: (a) determine the relevant set of media streams; and (b) determine the relevant segments $P_i^1, P_i^2, \ldots$ for each media stream $M_i$ in the set, based on a relevance criterion C. Here each relevant segment $P_i^l$ has a temporal extent from $t=s_i^l$ to $t=e_i^l$. The media indexing problem is to define a suitable relevance criterion C and derive a set of media indices based on this criterion to achieve media retrieval.

The media indexing and retrieval problems are significant when the media streams of interest are voluminous and manual review of the media streams is time consuming and impractical. This is especially true of video and audio streams.

Much of the video indexing and retrieval literature is concerned with segmenting video and defining indices for retrieval of video segments. Many popular techniques detect scene changes in broadcast or production video, and thereby break video into shots, represent each shot by a key frame, and use characteristics of these key frames for indexing. A significant challenge is to translate the semantic indexing criteria of the user into such low-level indices. Hence, many practical systems include interactive graphical user interfaces that allow a user to either directly modify the indexing criteria or provide relevance feedback to aid the system in adapting the indexing criteria.

While most existing systems have attempted to deal with a single stream of broadcast video, the invention is concerned with the situation where multiple sensors observe a physical environment. Examples of such situations abound, for example, in security, surveillance, and sports applications. Here again, the challenge is to define indexing criteria relevant to a user. Reviewing the individual media streams in their entirety is impractical. The user is typically interested in retrieving media based on the occurrence of specific kinds of events or activity that take place in the physical environment.

Hence, the first step is to derive meaningful activity functions. Activity functions may be spatial functions $A(x)$, temporal functions $A(t)$, or spatio-temporal functions $A(x, t)$, where x represents a point in the physical environment W and t is time. The activity functions may be derived from analyzing one or more of the media streams $M_i(t)$.

In addition, there could be other domain specific information that is of interest to the user, which could help in media retrieval. In general, the domain could have associated with it a set of events $E_1, E_2, \ldots$ where each event has a tag that assigns it to one of r event types $T_1, T_2, T_3, \ldots, T_r$. Each event $E_j$ also has associated with it a temporal extent from $t=s_j$ to $t=e_j$, and other descriptive information. For example, in the sports domain, an event could be a set in tennis, a touchdown in football, a corner-kick play in soccer, etc. Some such events are already available in most domains, providing indices into the media streams. These events may be inter-related and may form event hierarchies. An example of an event hierarchy is described below in section III. However, these events by themselves are often not rich enough to satisfy the user. Additional events need to be derived from the media streams or the activity functions described above. Again, effective user interfaces need to be provided so that users can interactively specify their media retrieval criteria.

Visual representations of spatio-temporal activity functions, which are generally referred to herein as "activity maps," can be a very useful interface for media retrieval. Such activity maps are particularly effective when they can be refined or filtered based on available domain-specific events. In accordance with the principles of the invention, the remainder of the detailed description will explain how activity maps can be generated, visually represented, and combined with available domain-specific events to interactively retrieve relevant multimedia data.

Activity functions can, in general, be based on the outputs of a variety of sensors such as temperature sensors, microphones, infrared cameras, video cameras, etc. Activity maps based on these different functions can be useful in media retrieval.

In accordance with the illustrative embodiments described herein, activity maps derived from video serve as a main focus. In particular, interest lies in motion of objects in the scene, which is typical of many surveillance and sports applications. Hence, objects $O_1, O_2, \ldots$ in the domain and object trajectory $X_u(t)$ corresponding to object $O_u$ are considered. The object trajectory function gives the three dimensional position of the object for each time instant t. Activity functions and corresponding maps are derived from the object trajectories. Two examples of activity functions are spatial coverage and speed. Spatial coverage by object $O_u$ is defined as:

$$A_c(x) = \int_x X_u(t) dt \quad (1)$$

The speed activity function for object $O_u$ is defined as:

$$A_s(t) = \left| \frac{d X_u(t)}{dt} \right|. \quad (2)$$

Once an activity function is computed and presented to a user in visual form, the user may select a spatial region, a temporal window, or a spatio-temporal region. This selection triggers: (a) the selection of media streams corresponding to the sensors which observe this region (this is determined by checking which zones of perception Z the region lies in); and (b) the selection of temporal windows within the media streams where the selected activity occurred.

For part (b), it is necessary to be able to relate activity in a region to the appropriate time windows within the trajectories that contribute to the selected activity. Therefore, at the time of computation of activity maps, an index structure of temporal segments is also computed. For each point x in the environment (or, more generally, for a cell in the environment), the index function is given by $I(x)=\tau_1, \tau_2, \ldots$ where $\tau_v$ refers to a temporal extent from $t=s_v$ to $t=e_v$. This concept of activity map based indexing is illustrated in FIG. 1.

Thus, the activity maps aid the user in indexing and retrieving the underlying multimedia data. The selected activity may be refined based on additional available event tags. It is to be appreciated that an activity map based indexing system of the invention serves as an interface to a database that organizes the information about the different objects, sensors, events, object trajectories, etc. By way of one example, an activity map based indexing system of the invention may serve as an interface to the database described in the concurrently filed U.S. patent application identified as Ser. No. 10/167,534 entitled "Instantly Indexed Databases for Multimedia Content Analysis and Retrieval." However, the invention may be implemented with other database systems.

It is to be appreciated that one key to indexing is the commonality of temporal extents of events and the underlying media streams. Hence, it is important that the various media streams be synchronized and recorded in a common time frame, along with the domain specific events.

It should be noted that while the activity maps may be derived from one or more media streams, they can be used to index not only the streams they are derived from, but also the other media streams observing the environment.

II. Architecture for Map Based Indexing

Figure 2:
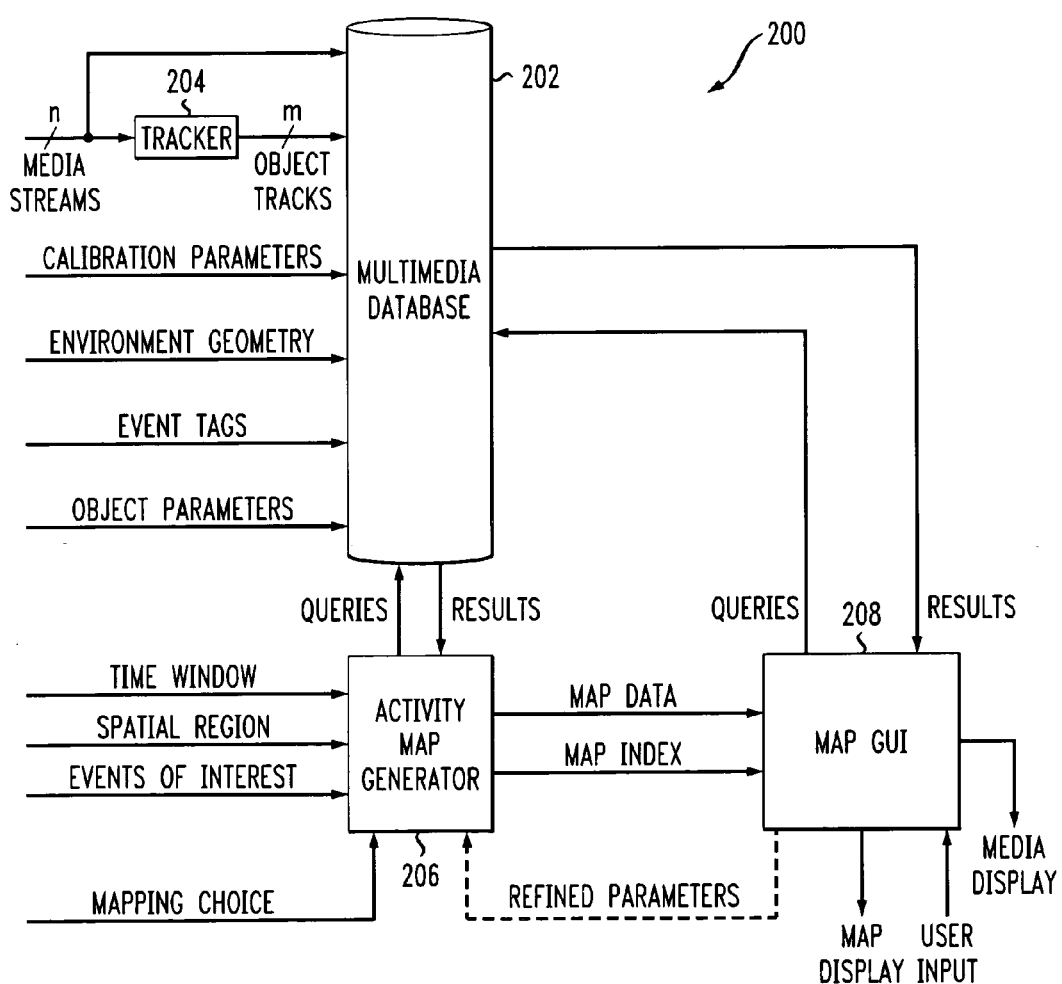
FIG. 2 is a block diagram illustrating an activity map based indexing system according to an embodiment of the present invention.

Referring now to FIG. 2, a block diagram illustrates an activity map based indexing system according to an embodiment of the present invention. As shown, the activity map based indexing system 200 comprises a multimedia database 202, a tracker module 204, an activity map generator 206 and a map graphical user interface (GUI) 208. The activity map based indexing system operates as follows.

Multiple media streams from sensors (not shown) watching a scene/event are stored (optionally compressed) in the multimedia database 202. Analysis is also performed on these incoming streams to detect and track objects moving in the scene. This analysis is performed by tracker module 204. By way of example, the tracker module 204 may implement the object (e.g., persons and items) tracking and analysis techniques described in U.S. Pat. Nos. 5,764,283 and 6,233,007, and in the U.S. patent application identified as Ser. No. 10/062,800 filed Jan. 31, 2002 and entitled "Real Time Method and Apparatus for Tracking a Moving Object Experiencing a Change in Direction," the disclosures of which are incorporated by reference herein. However, other tracking and analysis techniques may be used.

The analysis results in object tracks which represent the motion of objects in the scene. The resultant object tracks from the various media streams are stored along with object labels in the multimedia database 202. The tracks consist of sequences of spatio-temporal coordinates. All time codes in the system are referenced to a calibrated time source.

Further, as shown in FIG. 2, additional data is stored in the database 202. For example, calibration parameters of all the sensors are stored in the database 202 to facilitate mapping of trajectories from image coordinates to world coordinates. In addition, the database 202 stores the geometry of the environment and the location and geometry of known landmarks in the environment. Some dynamic event-related information is also stored in the database 202. This includes well-known and available event tags that describe specific events, as discussed above as domain related events. Other information stored in the database 202 includes further descriptions of specific objects and relationships between objects.

A user interacts with the multimedia database 202 to retrieve the media streams, trajectories, derivatives of trajectories such as statistics and graphs, and a host of other event-related and object related information. The challenge is to provide an efficient and intuitive interface to help the user easily find the data that is of interest. This is achieved in accordance with the present invention through a two-step interface.

First, the user provides choices to the activity map generator 206 which computes an activity map using data in the multimedia database 202. The map is a visualization which depicts the geometry of the environment and the spatially distributed activity in this environment over specific periods of time. Second, the map is displayed and itself becomes an interface that allows the viewer to select specific portions of the map and interactively retrieve the multimedia data corresponding to these portions from the database.

As shown in FIG. 2, the choices specified by the user to the activity map generator 206 include the time window(s), spatial region(s), events (as specified by the known event tags), and a mapping choice. The mapping choice determines which activity function, as described above in section I, is computed and visualized. Example choices include time spent by objects in different regions, direction of motion of objects, speed of objects, initiation or conclusion of motion, etc. Hybrid choices are also possible.

The activity map generator 206 queries the database 202 based on these choices, and computes a map from the results retrieved from the database 202. When computing the map, an index structure for each cell in the environment is also computed, as described above in section I.

The computed map is displayed by the map GUI 208 that allows the user to select map regions to retrieve video sequences or to further refine the map before selecting regions for video retrieval. The parameters that are refined by the user are fed back to the activity map generator 206 which, in turn, generates a refined map and index structure and inputs it back to the map GUI 208.

Visual activity maps thus act as a graphical user interface to the multimedia data. The advantage is that the user can determine the few seconds of data that is interesting in the hours of media data that has been collected.

Figure 3:
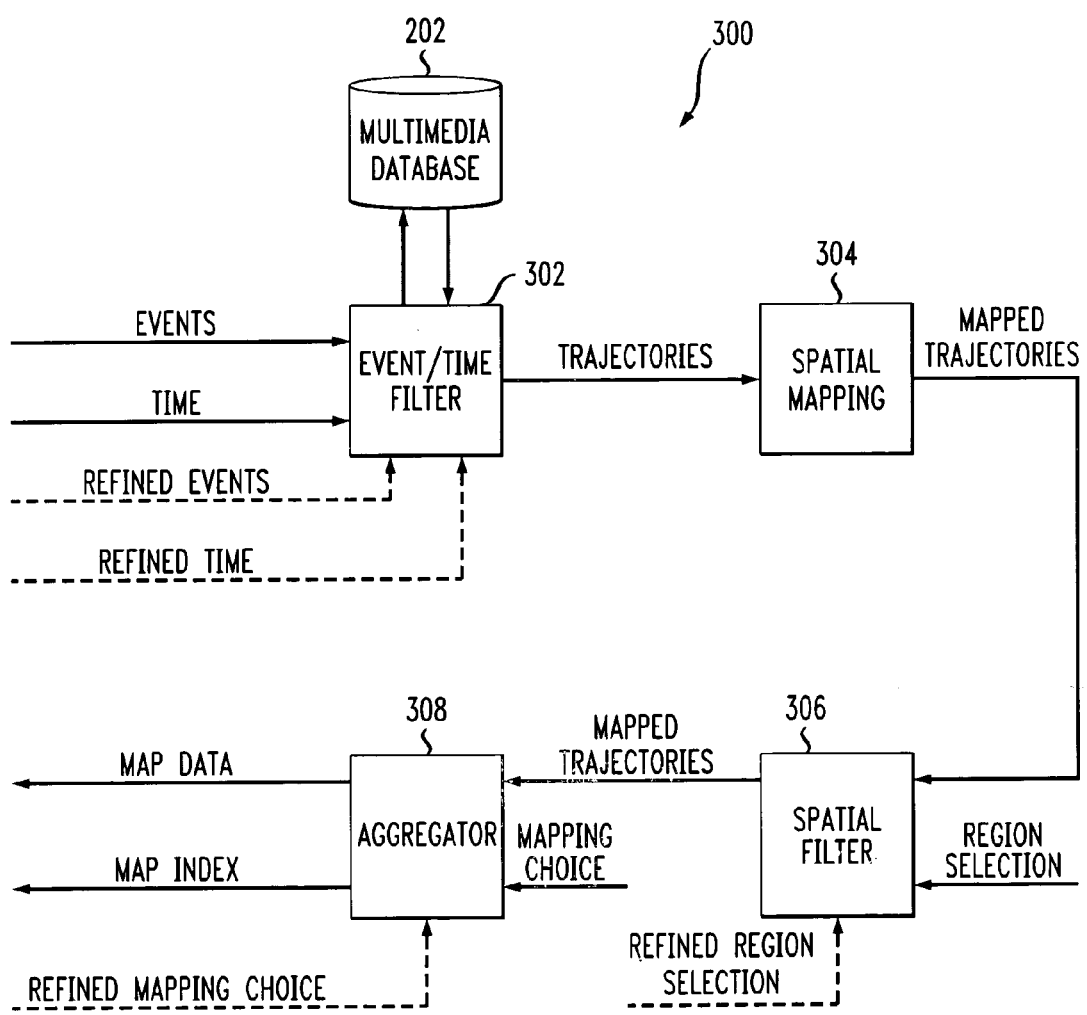
FIG. 3 is a block diagram illustrating an activity map generator according to an embodiment of the present invention.

Referring now to FIG. 3, a block diagram illustrates an activity map generator according to an embodiment of the present invention. As shown, an activity map generator 300 comprises an event/time filter 302, a spatial mapping module 304, a spatial filter 306 and an aggregator 308. The activity map generator 300 (denoted as block 206 in FIG. 2) interfaces to (accesses) the multimedia database 202. The activity map generator operates as follows.

As illustrated above in the context of FIG. 2, the user specifies several selection choices to the activity map generator including a time window of interest, events of interest, a spatial region of interest, and a mapping choice. Of these, the time window and event choices are fed to the event/time filter 302 within the activity map generator, as shown in FIG. 3. The event/time filter 302 queries the database 202 using the event/time choices and retrieves all trajectories corresponding to the selected events and within the selected time periods. The calibration parameters of the sensors are also retrieved along with the trajectories.

The retrieved trajectories and calibration parameters are then fed to the spatial mapping module 304 which maps using the calibration parameters all the trajectories from sensor/image coordinates to world coordinates, combining redundant trajectories. The trajectories, which are now in world coordinates are then input to the spatial filter 306 which also takes the region selection specified by the user. The spatial filter 306 retains only those portions of the mapped trajectories that lie within the region selection specified by the user. These spatially mapped trajectories are finally fed to an aggregator 308 along with the mapping choice specified by the user.

The aggregator 308 computes a spatio-temporal map from the trajectories according to the mapping choice. For instance, if the mapping choice is "coverage," the activity map is computed according to equation (1) above. The resulting map data is the output of the activity map generator 300.

The activity map generator 300 can also receive a refined set of input parameters as indicated by the dashed arrows in FIG. 3. These result from user choices and refinements made using the map GUI (block 208 in FIG. 2). The activity map generator 300 computes a new map based on these refined parameters and outputs this new map again to the map GUI. As explained above, the activity map generator 300 also computes an indexing structure when computing the activity function, and outputs the indexing structure along with the map data.

Figure 4:
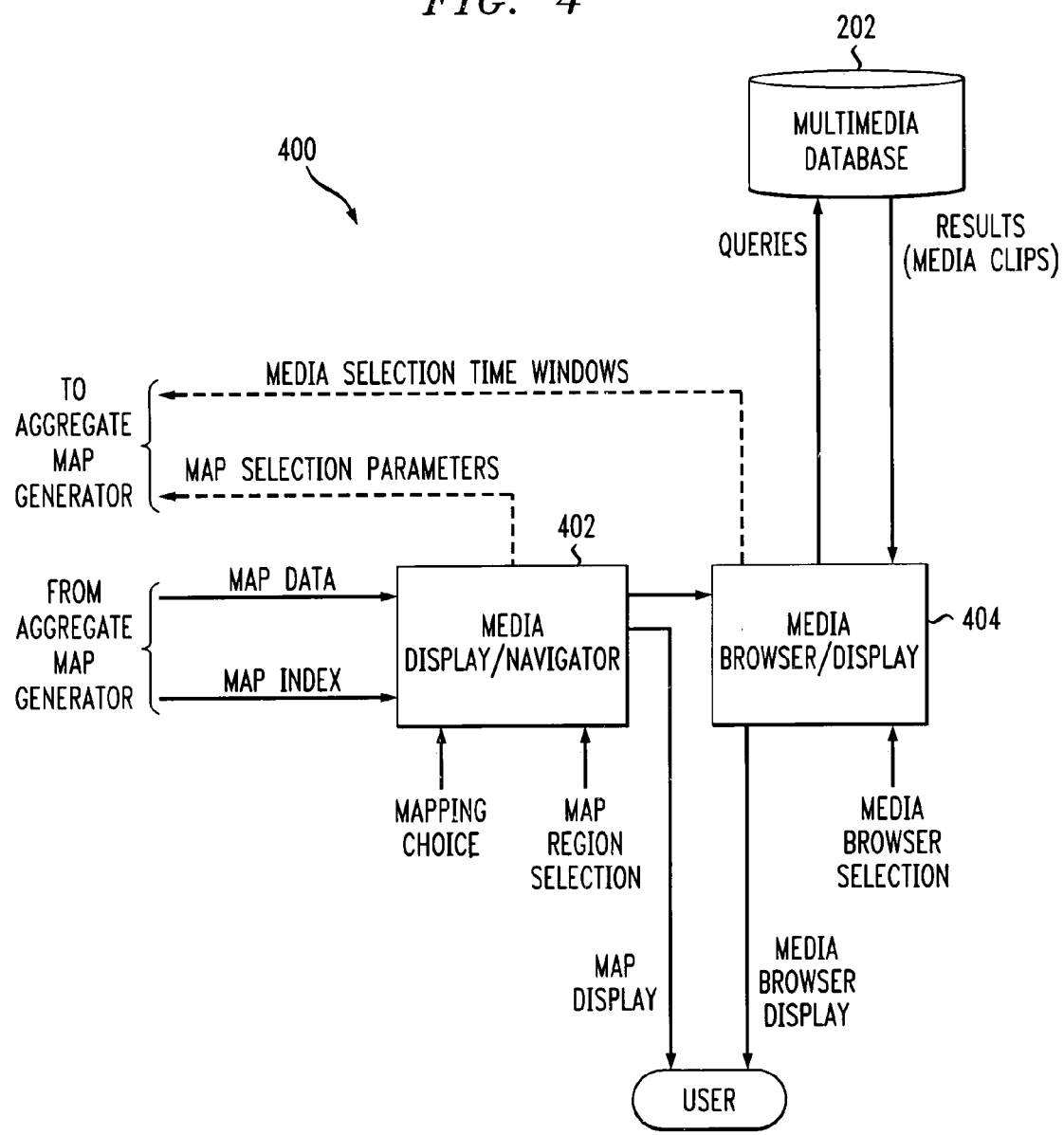
FIG. 4 is a block diagram illustrating an activity map graphical user interface according to an embodiment of the present invention.

Referring now to FIG. 4, a block diagram illustrates an activity map graphical user interface (GUI) according to an embodiment of the present invention. As shown, an activity map GUI 400 comprises a map display/navigator 402 and a media browser/display 404. The activity map GUI 400 (denoted as block 208 in FIG. 2) interfaces to (accesses) the multimedia database 202. The activity map generator operates as follows.

The incoming map data from the activity map generator (FIG. 3) is fed into the map display/navigator unit 402. This unit creates the actual visualization of the data for the user. The unit retrieves the geometry of the environment from the database 202 and creates a visualization that superposes map data on the environment geometry.

The map display/navigator unit 402 allows the user to navigate through this visualization to zoom in to particular areas, look at the visualization from different perspectives, and to select more specific regions of the visualization. The user can also choose a different mapping mechanism (for example, the user can change from a display of time spent to a display of relative speeds). These choices made by the user are fed back to the activity map generator to produce new map data which is then displayed back to the user for further map navigation and refinement.

The map displayed to a user summarizes activity over certain windows of time and space corresponds to media clips from specific sensors that observed this activity. Based on the environment geometry, the sensor parameters, and the user selected regions of the visualization, the map display/navigator unit 402 determines the set of sensors corresponding to these regions. The relevant time windows for each sensor are determined using the indexing structure that comes along with the map data.

Identifiers for each sensor, along with the corresponding time windows are fed to the media browser/display unit 404. The media browser/display unit 404 retrieves the relevant video clips from the multimedia database 202 and displays them in summary form to the user. The user can interactively refine their selection of media clips within the browser 404. The selections made here (particular time windows and particular sensors) are fed back to the activity map generator which computes a new map which is in turn displayed by the map display/navigator unit 402. Thus, the user can navigate either through the map display or the media browser display, and selections made using any one of the displays are immediately reflected in the other display. In this manner, the user can quickly converge on to the interesting media clips in the vast amount of media data stored in the database.

Figure 5:
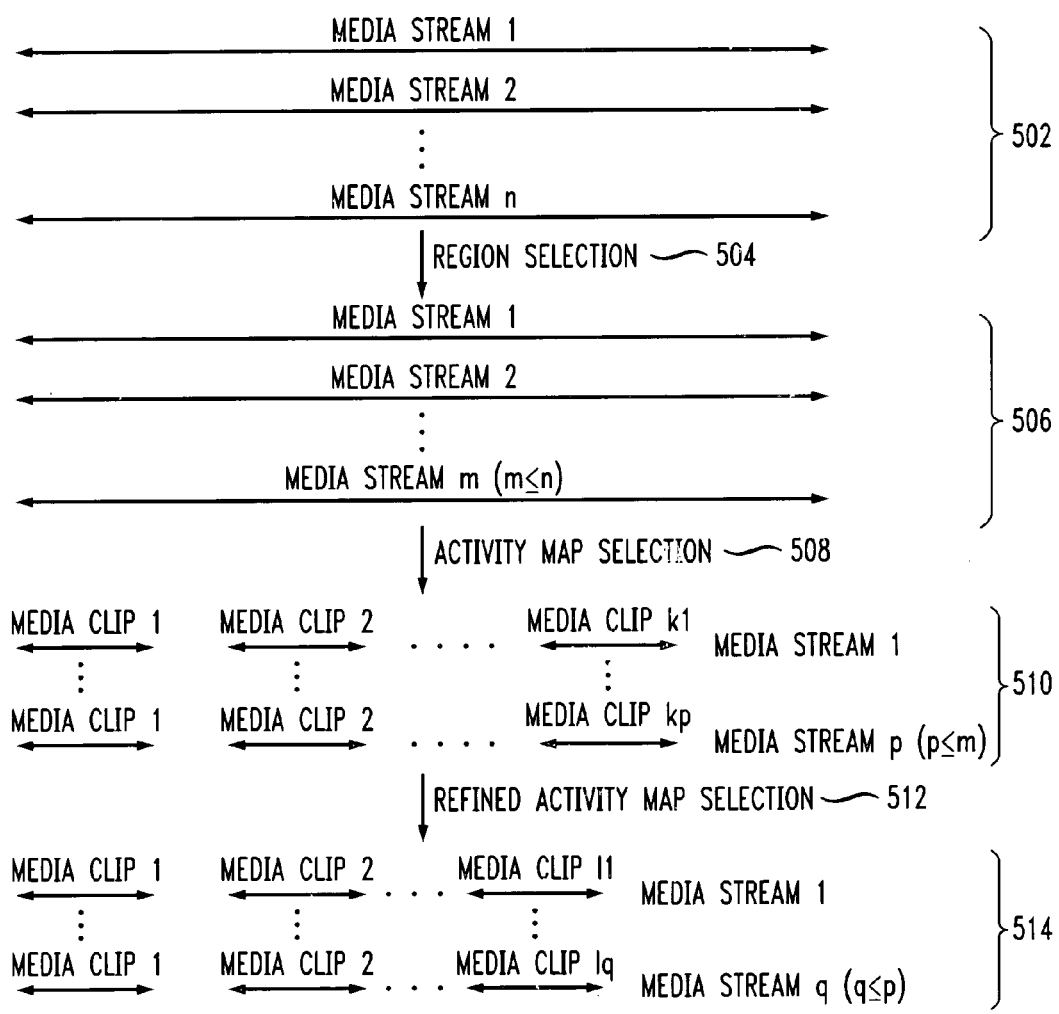
FIG. 5 is a diagram illustrating a reduction in media search volume realized through activity map based indexing according to the present invention.

Referring now to FIG. 5, a diagram illustrates the significant reduction in media search volume realized through activity map based indexing according to the present invention. That is, the diagram illustrates how the volume of media data is reduced as the user specifies choices and refines these choices by navigating through the map GUI.

Initially, the user specifies a time window of interest which results in n media streams (denoted as 502 in FIG. 5) corresponding to all n sensors over this time window. The user then specifies a region selection (step 504), which eliminates some sensors which do not correspond to the selected region. Thus, the volume of media to be searched is reduced to m media streams, where $m \leq n$, (denoted as 506 in FIG. 5) over the previously specified time window.

Next, the user views an activity map and selects (step 508) a region within the activity map. This dramatically reduces the volume of media to be searched. Now, instead of m continuous streams, there are p streams (where $p \leq m$), each stream i consisting of $k_i$ media clips corresponding to the times when activity actually occurred (denoted as 510 in FIG. 5).

As the user further refine his/her selection (step 512), both the number of media streams and the number of media clips within each stream are further reduced to q streams (where q<p), helping the user to converge on to the specific clips he/she are interested in.

III. Example Application

Figure 6:
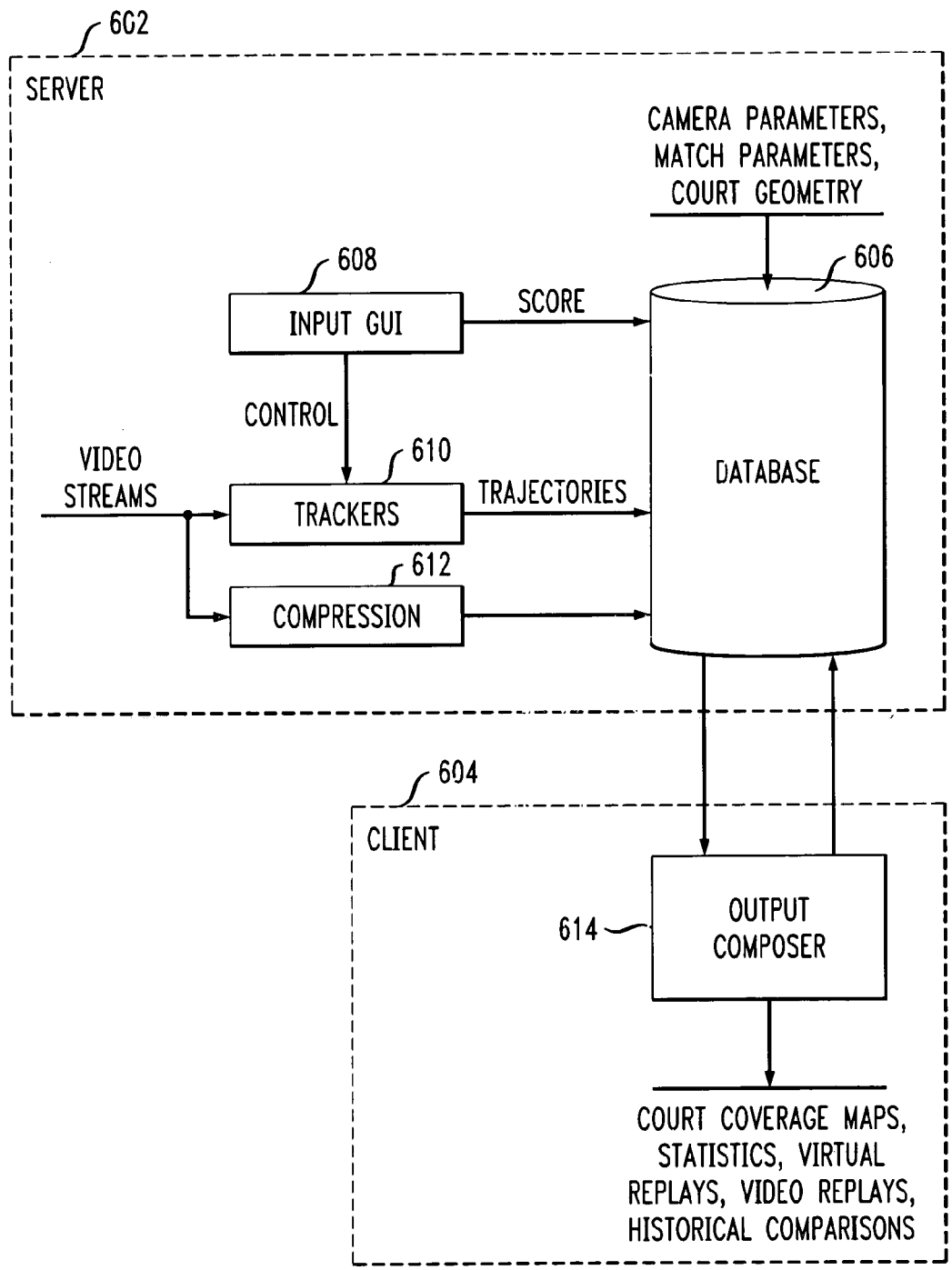
FIG. 6 is a block diagram illustrating a multimedia database system in which activity map based indexing according to the present invention may be implemented.

Referring now to FIG. 6, a block diagram illustrates a multimedia database system in which activity map based indexing according to an embodiment of the present invention may be implemented. In particular, FIG. 6 illustrates a multimedia database system 600 in the context of a tennis application.

The system 600 is implemented in accordance with a server 602 and a client device 604 coupled via an appropriate network, e.g., local area network (LAN), Internet, etc. As shown, the server 602 comprises a multimedia database 606, an input GUI 608, tracker modules 610 and compression module 612. The client device 604 comprises an output composer module 614. In general, operation of the system is as follows. The system may operate with more than one server and more than one client device.

The system 600 uses multiple cameras placed around a tennis stadium (not shown) to observe the sports action. The video from the cameras is analyzed in real time by one or more tracker modules 610 (as explained below) to determine the motion trajectory of each player and the ball. These motion trajectories are stored in the database 606 along with other available domain specific information. This includes the dynamic score and the organization of a match into sets and games. This data may be input via input GUI 608.

Compressed video from one or more cameras is also stored in the database 606 via compression module 612. The produced broadcast video is also preferably stored in compressed form, and the video from the eight cameras is used for trajectory capture.

The system 600 supports query of the database 606 to produce a variety of visualizations realized by the user via the output composer 614. These visualizations may be used in live television and Internet broadcasts of international tennis matches to better explain the performance and strategy involved in the sport. It is to be appreciated that the map based indexing techniques of the invention may be implemented in the system 600 and used to assist in realization of such visualizations.

It is also to be appreciated that the system 600 may also implement the performance data mining techniques described in the concurrently filed U.S. patent application identified as Ser. No. 10/167,533 entitled "Performance Data Mining Based on Real Time Analysis of Sensor Data." Also, the system 600 may implement the techniques described in U.S. Pat. No. 6,141,041 issued on Oct. 31, 2000 and entitled "Method and Apparatus for Determination and Visualization of Player Field Coverage in Sporting Event," the disclosure of which is incorporated by reference herein.

The system 600 uses visual tracking (tracker modules 610) to detect and track the players and the ball. By way of example, the tracker modules may implement the object (e.g., persons and items) tracking and analysis techniques described in U.S. Pat. Nos. 5,764,283 and 6,233,007, and in the U.S. patent application identified as Ser. No. 10/062,800 filed Jan. 31, 2002 and entitled "Real Time Method and Apparatus for Tracking a Moving Object Experiencing a Change in Direction." Multiple cameras (e.g., eight) are used for this purpose. The player tracking preferably uses two cameras, each covering one half of the court to track the player in that half. The player tracker segments out foreground/motion regions using differencing operations, tracks local features in the segmented regions, and dynamically clusters the motion of unstable local features to form a stable motion trajectory corresponding to the centroid of the player.

Six additional cameras are preferably used to track the motion of the ball. The six cameras are divided into four logical pairs and four separate threads are used to track the ball in each serving direction. The first thread which succeeds in detecting the ball continues to track the ball in a pair of views and triggers a thread corresponding to an adjacent camera pair when the ball goes out of bounds of its camera pair. Ball detection is based on motion, intensity, and shape matching. Each thread performs stereo matching for determining three dimensional (3D) position and uses velocity estimation and prediction to constrain the search during tracking.

A triggering thread passes on the current 3D trajectory to the triggered thread and provides initial expected locations of the ball based on velocity estimation and 3D to image plane mapping. The multi-threaded approach taken to tracking is scalable to many more cameras and to multiple tracked objects.

In terms of the formulation in section I above in the context of FIG. 1, the tennis application has eight video cameras $S_1, \ldots, S_8$ producing video streams $M_1, \ldots, M_8$. Calibration parameters of these cameras are stored in the database and are used to compute the zones of perception $Z_i$ of each camera. In addition, there is a special video stream $M_b$ which represents the broadcast production video. This is typically the video that is ultimately of interest to the user.

Following the formulation in section I above, there are three objects of interest in this environment, namely the two players and the ball represented by $O_{p1}$, $O_{p2}$, $O_b$. Each of these objects has trajectories $X_{p1}(t)$, $X_{p2}(t)$, $X_b(t)$ respectively associated therewith. As explained above in section II, specific domain related events are also stored in the database. The events here reflect the basic structure of a tennis match, and form an event hierarchy. A "match" event of type $T_m$ consists of "set" events of type $T_s$, which in turn consist of "game" events of type $T_g$, which finally consist of "point" events of type $T_p$. Each of these events has a unique identifier, an associated temporal extent, and an associated score. The trajectories $X_{p1}(t)$, $X_{p2}(t)$, $X_b(t)$ corresponding to the player and the ball are associated with every "point" event as "point" events represent the lowest denomination of playtime in the tennis event hierarchy. As the system 600 is a real time capture system, the timing of all the cameras, and the timing of the events are synchronized and use the same reference clock.

To enable activity based indexing according to the invention, the environment is divided into "cells." Each cell has several cameras associated with it, corresponding to the zones of perception it is part of. For the tennis application, two dimensional cells are formed from a grid over the surface of the court. These are stored in a world coordinate system.

Once the tennis activity is captured into the database, as described above, a user can explore a virtual version of the event. A powerful mechanism of data selection is offered, allowing the user to choose only the subset that he/she finds interesting.

The architecture for indexing and retrieval used by the system 600 is as described above in section II. As explained therein, an interface is provided to the user which allows them to specify a "time window" of interest, "events" of interest, and a suitable "mapping choice." For the tennis application, the time windows are typically described in terms of a set, a game, a match, or several selected matches. Events of interest are typically based on the score such as "points won by player x," "points lost by player y," "points when player x was serving," or hybrid combinations of winning/losing, serving/receiving, and selection of player A/player B, for example, "all points won by player A against player B's serve." In addition there, are several special types of points such as "breakpoints," "aces," etc.

As explained in section II above, the event and time choices made by the user result in the selection of corresponding trajectories from the database. The user also specifies a mapping choice which determines the activity map that is displayed to him/her. A variety of mapping choices are available to the user. Some examples are: (i) coverage of the court for each player; (ii) end-positions of each player for each "point;" (iii) directionality of player motion; (iv) speed of player motion; (v) three dimensional trajectory of the ball for each selected serve; (vi) landing positions of the ball; and (vii) speed of the ball at receiver.

Figure 7A:
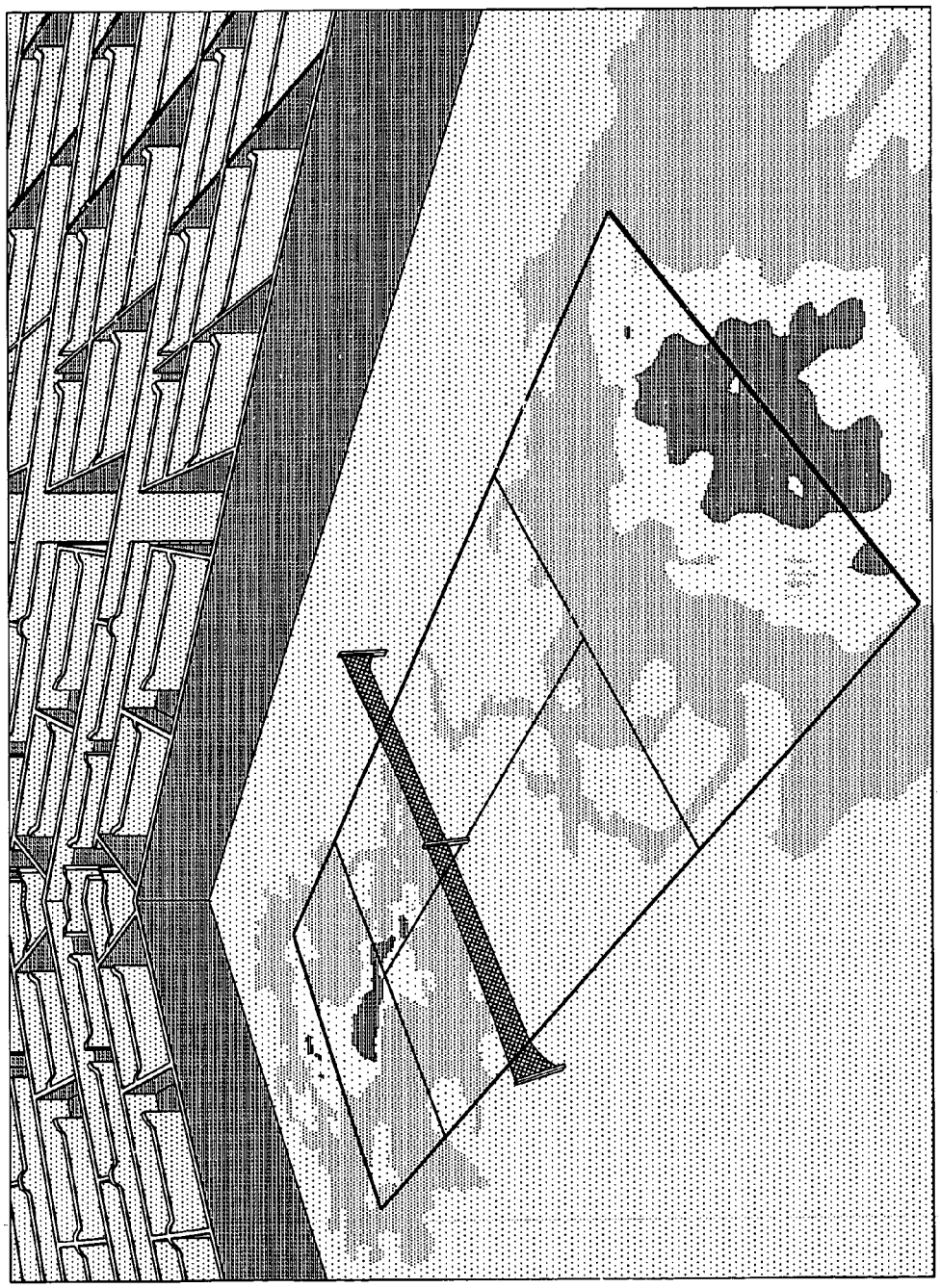
FIG. 7A is an example of a spatial coverage map generated and presented in accordance with an embodiment of the present invention.
Figure 7B:
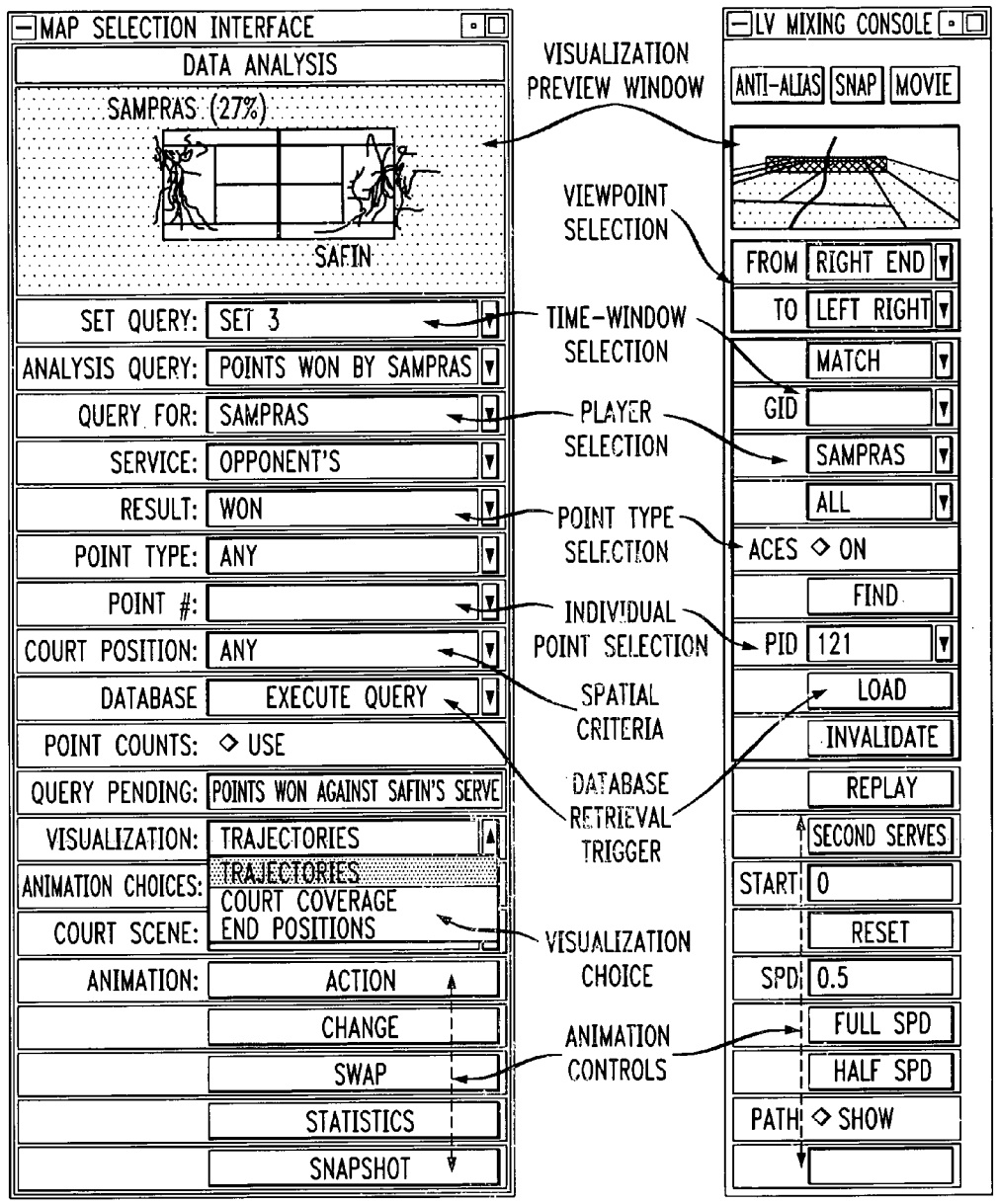
FIG. 7B is an example of user interfaces generated and presented in accordance with an embodiment of the present invention.

The mapping choice results in the display of an activity map to the user, as described in section II above. The spatial activity maps are displayed as different types of overlays on a three dimensional model of the tennis court. FIG. 7A is an example of a spatial coverage map generated and presented in accordance with an embodiment of the present invention. As shown, the shaded regions over the model of the tennis court represent the spatial coverage associated with both players for an entire match. Of course, the invention is not limited to such a specific visualization. Further, FIG. 7B is an example of user interfaces generated and presented in accordance with an embodiment of the present invention. These interfaces may assist the user in selecting visualizations. Again, the invention is not limited to such a specific interfaces.

The user then selects specific regions of the court corresponding to activity of interest and/or modifies his/her choices for events and the mapping scheme to further refine his/her selection. Simultaneously, a media browser (e.g., 404 in FIG. 4) is displayed, allowing the user to browse the video corresponding to his/her selections.

IV. Exemplary Computer System

Figure 8:
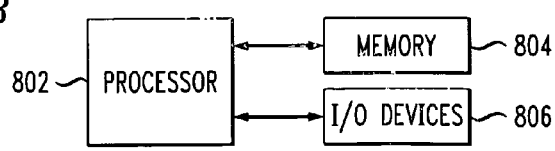
FIG. 8 is a block diagram illustrating a generalized hardware architecture of a computer system suitable for implementing one or more functional components of an activity map based indexing system according to the present invention.

Referring finally to FIG. 8, a block diagram illustrates a generalized hardware architecture of a computer system suitable for implementing one or more of the functional components of the activity map based indexing system as depicted in the figures and explained in detail herein. It is to be understood that the individual components of the system, e.g., as illustrated in FIGS. 2, 3 and 4, may be implemented on one such computer system, or more preferably, on more than one such computer system. In the case of an implementation on a distributed computing system, the individual computer systems and/or devices may be connected via a suitable network, e.g., the Internet or World Wide Web. However, the system may be realized via private or local networks. The invention is not limited to any particular network. Also, the components of the system may be implemented in a client/server architecture, as shown in FIG. 6. Thus, the computer system depicted in FIG. 8 represents a client device or a server.

As shown, the computer system may be implemented in accordance with a processor 802, a memory 804 and I/O devices 806. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. The memory 804 includes the memory capacity for implementing the multimedia database. In addition, the term "input/output devices" or "I/O devices" as used herein is intended to include, for example, one or more input devices (e.g., cameras, microphones, keyboards, etc.) for entering data to the processing unit, and/or one or more output devices (e.g., speaker, display, etc.) for presenting results associated with the processing unit. It is also to be understood that the term "processor" may refer to more than one processing device and that various elements associated with a processing device may be shared by other processing devices.

Further, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Accordingly, as described in detail herein, the present invention introduces the concept of activity map based indexing for multimedia retrieval. The formulation is applicable to a variety of surveillance applications where multiple sensors observe a physical environment. The activity map based techniques of the invention serve as a powerful tool that helps the user first discover interesting patterns in the data. Once interesting patterns are found, the underlying media data is quickly recovered using the indexing mechanism.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method of performing data retrieval in accordance with a database storing media associated with an application and captured by one or more sensors monitoring an environment associated with the application, the method comprising the steps of:

computing an activity function related to at least one activity associated with the monitored application;

computing at least one index to the media stored in the database that corresponds to the computed activity function;

generating at least one visual representation of the activity function, in response to an input event, wherein the visual representation is in the form of an activity map;

selecting, in response to the input event or another input event, a desired aspect of the activity map; and retrieving via the computed index, for presentation, at least a portion of the media stored in the database that corresponds to the desired aspect of the activity map.

2. The method of claim 1, further comprising the step of generating at least one refined visual representation, before the retrieval step, in response to the aspect selection step.

3. The method of claim 1, wherein at least one of the input events comprises one or more of a spatial region associated with the visual representation, a temporal region associated with the visual representation, a spatio-temporal region associated with the visual representation, specification of at least one event associated with the application, and an activity function selection.

4. The method of claim 1, wherein the visual representation is a visualization of a geometry of the environment and of a spatially distributed activity in the environment over a particular time period.

5. The method of claim 1, whereby the portion of the media stored in the database that corresponds to the desired aspect of the visual representation is randomly accessed and retrieved from the database.

6. The method of claim 1, wherein the visual representation is at least partially derived from trajectories of the motion of one or more objects in the environment.

7. The method of claim 1, wherein the visual representation represents at least a partial summarization of media associated with the application.

8. The method of claim 1, wherein the application is a real time application.

9. The method of claim 1, wherein the application is one of a security-related application, a surveillance-related application and a sporting application.

10. Apparatus for performing data retrieval in accordance with a database storing media associated with an application and captured by one or more sensors monitoring an environment associated with the application, the apparatus comprising:

at least one processor operative to: (i) compute an activity function related to at least one activity associated with the monitored application; (ii) compute at least one index to the media stored in the database that corresponds to the computed activity function; (iii) generate at least one visual representation of the activity function, in response to an input event, wherein the visual representation is in the form of an activity map; (iv) enable selection, in response to the input event or another input event, of a desired aspect of the activity map; and (v) retrieve via the computed index, for presentation, at least a portion of the media stored in the database that corresponds to the desired aspect of the activity map.

11. The apparatus of claim 10, wherein the at least one processor is further operative to generate at least one refined visual representation, before the retrieval operation, in response to the aspect selection operation.

12. The apparatus of claim 10, wherein at least one of the input events comprises one or more of a spatial region associated with the visual representation, a temporal region associated with the visual representation, a spatio-temporal region associated with the visual representation, specification of at least one event associated with the application, and an activity function selection.

13. The apparatus of claim 10, wherein the visual representation is a visualization of a geometry of the environment and of a spatially distributed activity in the environment over a particular time period.

14. The apparatus of claim 10, whereby the portion of the media stored in the database that corresponds to the desired aspect of the visual representation is randomly accessed and retrieved from the database.

15. The apparatus of claim 10, wherein the visual representation is at least partially derived from trajectories of the motion of one or more objects in the environment.

16. The apparatus of claim 10, wherein the visual representation represents at least a partial summarization of media associated with the application.

17. An article of manufacture for performing data retrieval in accordance with a database storing media associated with an application and captured by one or more sensors monitoring an environment associated with the application, the article comprising a machine readable recording medium containing one or more programs which when executed implement the steps of:

computing an activity function related to at least one activity associated with the monitored application;

computing at least one index to the media stored in the database that corresponds to the computed activity function;

generating at least one visual representation of the activity function, in response to an input event, wherein the visual representation is in the form of an activity map;

selecting, in response to the input event or another input event, a desired aspect of the activity map; and retrieving via the computed index, for presentation, at least a portion of the media stored in the database that corresponds to the desired aspect of the activity map.

18. A system for providing an interface to a database storing media associated with an application and captured by one or more sensors monitoring an environment associated with the application, the system comprising:

a visual representation generator, operatively coupled to the database; and a graphical user interface, operatively coupled to the visual representation generator and the database;

wherein the visual representation generator generates at least one activity map associated with the monitored application, in response to an input event; the graphical user interface presents the activity map; a desired aspect associated with the activity map is selected via the graphical user interface; and the graphical user interface retrieves, for presentation, at least a portion of the media stored in the database that corresponds to the desired aspect of the visual representation;

further wherein the activity map corresponds to at least one activity function computed for at least one activity associated with the monitored application, and media is retrieved from the database via at least one corresponding index computed for the at least one activity function.

19. The system of claim 18, wherein the visual representation generator generates at least one refined visual representation for presentation, before media retrieval, in response to the aspect selected.

20. The system of claim 18, wherein the visual representation generator comprises a filter for querying the database to retrieve trajectories of the motion of one or more objects in the environment corresponding to at least one event and at least one time period of the application.

21. The system of claim 18, wherein the visual representation generator comprises a spatial mapping module for mapping object trajectories.

22. The system of claim 18, wherein the visual representation generator comprises a filter for filtering object trajectories based on a spatial selection.

23. The system of claim 18, wherein the visual representation generator comprises an aggregator for generating the activity map based on a mapping selection.

24. The system of claim 18, wherein the graphical user interface comprises a map navigator module for creating a presentation of the activity map based on data associated with the activity map and a geometry associated with the environment.

25. The system of claim 18, wherein the graphical user interface comprises a media browser for retrieving relevant media from the database.

26. The method of claim 1, wherein the computed activity function comprises a spatial coverage activity function representative of a spatial coverage associated with an object being monitored in the environment.

27. The method of claim 1, wherein the computed activity function comprises a speed activity function representative of a speed associated with an object being monitored in the environment.

28. The method of claim 1, wherein the computed activity function comprises a result of an integral operator or a differential operator applied to object tracking information in the environment.

* * * * *